US011872568B2

(12) United States Patent
Larsson

(10) Patent No.: US 11,872,568 B2
(45) Date of Patent: Jan. 16, 2024

(54) CENTRIFUGAL SEPARATOR HAVING A ROTARY TRANSFORMER AND A USER OF ELECTRIC ENERGY

(71) Applicant: ALFA LAVAL CORPORATE AB, Lund (SE)

(72) Inventor: Per-Gustaf Larsson, Huddinge (SE)

(73) Assignee: ALFA LAVAL CORPORATE AB, Lund (SE)

( * ) Notice: Subject to any disclaimer, the term of this patent is extended or adjusted under 35 U.S.C. 154(b) by 811 days.

(21) Appl. No.: 16/976,114

(22) PCT Filed: Feb. 19, 2019

(86) PCT No.: PCT/EP2019/054065
§ 371 (c)(1),
(2) Date: Aug. 27, 2020

(87) PCT Pub. No.: WO2019/166276
PCT Pub. Date: Sep. 6, 2019

(65) Prior Publication Data

US 2020/0406272 A1 Dec. 31, 2020

(30) Foreign Application Priority Data

Feb. 28, 2018 (EP) .................................... 18159103

(51) Int. Cl.
*B04B 13/00* (2006.01)
*B04B 9/02* (2006.01)
(Continued)

(52) U.S. Cl.
CPC .............. *B04B 13/003* (2013.01); *B04B 9/02* (2013.01); *B04B 9/10* (2013.01); *B04B 11/02* (2013.01); *B04B 2013/006* (2013.01)

(58) Field of Classification Search
CPC ........... B04B 13/003; B04B 9/02; B04B 9/10; B04B 11/02; B04B 2013/006; B04B 13/00; H02K 7/16
See application file for complete search history.

(56) References Cited

U.S. PATENT DOCUMENTS 5,055,775 A 10/1991 Scherz et al.
5,529,566 A * 6/1996 Weil ...................... B04B 1/2016 494/7

(Continued)

FOREIGN PATENT DOCUMENTS

CN 102123795 A 7/2011
CN 102341180 A 2/2012

(Continued)

OTHER PUBLICATIONS

English translation of Chinese Office Action and Search Report for Chinese Application No. 201980015674.X, dated Aug. 16, 2021.

(Continued)

*Primary Examiner* — Walter D. Griffin
*Assistant Examiner* — Shuyi S. Liu
(74) *Attorney, Agent, or Firm* — Birch, Stewart, Kolasch & Birch, LLP

(57) ABSTRACT

A centrifugal separator includes a rotor arrangement and a drive arrangement. A user of electric energy is arranged in the rotor arrangement. The centrifugal separator includes a rotary transformer, the rotary transformer including a transformer stator and a transformer rotor. The transformer stator and the transformer rotor are arranged adjacent to each other with an airgap therebetween. The transformer rotor includes a secondary coil and is rotatable together with the rotor arrangement. The secondary coil is electrically connected to the user of electric energy arranged in the rotor arrangement for providing the user of electric energy with an electric (Continued)

current. The user of electric energy may be an actuator, and/or a sensor, and/or a control unit.

11 Claims, 5 Drawing Sheets

(51) Int. Cl.
*B04B 9/10* (2006.01)
*B04B 11/02* (2006.01)

(56) References Cited

U.S. PATENT DOCUMENTS

| | | | | | |
|---|---|---|---|---|---|
| 5,572,178 | A * | 11/1996 | Becker | H01F 38/18 336/120 |
| 5,814,900 | A | 9/1998 | Esser et al. | |
| 6,011,490 | A | 1/2000 | Tonnesen et al. | |
| 10,086,384 | B2 | 10/2018 | Thorwid et al. | |
| 10,357,787 | B2 | 7/2019 | Thorwid et al. | |
| 10,639,650 | B2 | 5/2020 | Mackel et al. | |
| 2003/0072098 | A1* | 4/2003 | Blatchley | G11B 5/53 |
| 2006/0011563 | A1 | 1/2006 | Meikrantz | |
| 2010/0230355 | A1* | 9/2010 | Kerr | B01D 15/1892 210/198.2 |
| 2011/0183830 | A1 | 7/2011 | Tietze et al. | |
| 2012/0038308 | A1 | 2/2012 | Zadeh | |
| 2015/0045199 | A1 | 2/2015 | Thorwid et al. | |
| 2015/0191660 | A1 | 7/2015 | Englund | |
| 2016/0074881 | A1 | 3/2016 | Hillström et al. | |

FOREIGN PATENT DOCUMENTS

| | | | | |
|---|---|---|---|---|
| CN | 104245146 | A | 12/2014 | |
| CN | 104379706 | A | 2/2015 | |
| CN | 105228753 | A | 1/2016 | |
| CN | 105289859 | A | 2/2016 | |
| CN | 107073485 | A | 8/2017 | |
| CN | 107413538 | A | 12/2017 | |
| DE | 10 2006 056 682 | A1 | 7/2007 | |
| DE | 102006056682 | A1 * | 7/2007 | H01F 38/18 |
| EP | 0 902 265 | A1 | 3/1999 | |
| EP | 1 247 584 | A2 | 10/2002 | |
| EP | 1 247 584 | A3 | 11/2002 | |
| EP | 3 415 239 | A1 | 12/2018 | |
| GB | 994936 | | 6/1965 | |
| JP | 51-67 | | 1/1976 | |
| JP | 57-165049 | A | 10/1982 | |
| JP | 61-79514 | U | 5/1986 | |
| JP | 2002-50530 | A | 2/2002 | |
| JP | 2006-287040 | A | 10/2006 | |
| JP | 2010-526640 | A | 8/2010 | |
| JP | 2013021749 | A * | 1/2013 | |
| JP | 2016-522745 | A | 8/2016 | |
| WO | WO 2008/140561 | A1 | 11/2008 | |
| WO | WO 2010/102987 | A1 | 9/2010 | |

OTHER PUBLICATIONS

International Search Report, issued in PCT/EP2019/054065, dated May 21, 2019.
Wikipedia, “Rotary transformer”, https://en.wikipedia.org/wiki/Rotary_transformer, last edited on Jun. 27, 2018, total 2 pages.
Written Opinion of the International Searching Authority, issued in PCT/EP2019/054065, dated May 21, 2019.
English Translation of Japanese Office Action dated Nov. 1, 2021 for Application No. 2020-545256.

* cited by examiner

CENTRIFUGAL SEPARATOR HAVING A ROTARY TRANSFORMER AND A USER OF ELECTRIC ENERGY

TECHNICAL FIELD

The invention relates to a method of operating a centrifugal separator, and to a centrifugal separator.

BACKGROUND

A centrifugal separator comprises a rotor arrangement and a drive arrangement. The rotor arrangement comprises a spindle and a separator bowl. The drive arrangement is configured for rotating the rotor arrangement about a rotation axis. Inside the separator bowl there is a separation space wherein a stack of frustoconical separation discs is arranged. A fluid mixture is fed into the separation space and the disc stack, and is separated into at least a light fluid phase and a heavy fluid phase during rotation of the rotor. The light and heavy fluid phases may be continuously led out of the rotor.

U.S. Pat. No. 6,011,490 discloses an apparatus for measurement of a position of an interface between two fluids in a centrifuge rotor during rotation. The apparatus comprises an electric or magnetic sensor mounted internally on a wall in the centrifuge rotor, and means for contact-free and intermittent transmission of measurement signals from the sensor to a stationary measuring unit outside the centrifuge rotor. The sensor comprises an active electronic circuit adapted to store measurement values that are recorded during at least a portion of a revolution of the rotor, before said transmission of corresponding measurement signals to the measuring unit. Electric power supply to the electronic circuit is provided for by generator means comprising a stationary magnet near the rotor and a coil mounted in the rotor so that a voltage is induced in the coil during movement past the magnet means during a portion of one rotation of the rotor.

An alternative way of providing electrical energy to a rotor may be to utilise a transformer. U.S. Pat. No. 5,814,900 discloses a device in the form of a transformer for transmitting electrical energy. The device comprises of a core of a ferromagnetic material and a primary coil and a secondary coil wound about the core. At least one receiver in the form of an areal antenna and at least one sender in the form an areal antenna are arranged in the direct vicinity of the primary and secondary coils for a contact-free transmittal of changing signals.

SUMMARY

It is an object of the invention to ensure stable operating conditions for a user of electric energy in a rotor arrangement of a centrifugal separator.

According to an aspect of the invention, the object is achieved by a centrifugal separator comprising a rotor arrangement and a drive arrangement. The rotor arrangement comprises a spindle, a separator bowl enclosing a separation space, and a user of electric energy. The centrifugal separator comprises an inlet for a fluid mixture, and an outlet for a separated fluid. The inlet is fluidly connected with the separation space, and the outlet is fluidly connected with the separation space. The drive arrangement is connected to, or forms part of, the spindle and is configured to rotate the rotor arrangement about a rotation axis X. The centrifugal separator comprises a rotary transformer, the rotary transformer comprising a transformer stator and a transformer rotor, wherein the transformer stator and the transformer rotor are arranged adjacent to each other with an airgap therebetween, and wherein the transformer rotor comprises a secondary coil and is rotatable together with the rotor arrangement, wherein the secondary coil is electrically connected to the user of electric energy arranged in the rotor arrangement for providing the user of electric energy with an electric current. The centrifugal separator comprises an actuator arranged in the rotor arrangement, the actuator forming at least part of the user of electric energy, and/or the centrifugal separator comprises a sensor arranged in the rotor arrangement, the sensor forming at least part of the user of electric energy, and/or the centrifugal separator comprises a control unit arranged in the rotor arrangement, the control unit forming at least part of the user of electric energy.

Since the centrifugal separator comprises the rotary transformer as defined above, an alternating current supplied to the transformer stator is transferred to the transformer rotor. The alternating current received by the transformer rotor, specifically by the secondary coil of the transformer rotor, is utilised for supplying the electric current to the user of electric energy arranged in the rotor arrangement. Thus, the user of electric energy in the rotor arrangement is able to operate inside the rotor arrangement as the rotor arrangement rotates. Accordingly, stable operating conditions are provided for the user of electric energy. As a result, the above-mentioned object is achieved.

Since a current may continuously be transferred to the transformer rotor, the user of electric energy may operate continuously as the rotor arrangement rotates, but also when the rotor arrangement is stationary. Thus, the user of electric energy may not only comprise low current consumers such as the sensor or control unit, but additionally or alternatively may comprise a high current consumer such as the actuator.

The centrifugal separator may be configured for separating a fluid mixture into at least a light fluid phase and a heavy fluid phase. The centrifugal separator may be a high speed centrifugal separator, i.e. the rotor arrangement may rotate a rotational speed of several thousands of RPM, such as e.g. at least 2000 RPM, or at least 4000 RPM, or at least 6000 RPM, creating a gravitational field of at least 500 G, or at least 1000 G, or at least 2000 G. Inside the separation space, a stack of frustoconical separation discs may be arranged. The user of electric energy may be a large current consumer in comparison with electric energy users inside rotor arrangements of prior art centrifugal separators. The user of electric energy may comprise one large electric energy consumer, or several electric energy consumers.

The transformer stator may comprise a primary coil to which the alternating current is supplied for transfer to the transformer rotor and the secondary coil.

According to embodiments, the transformer stator may be arranged radially outside the transformer rotor, seen from the rotation axis X. In this manner, an axially space saving arrangement of the rotary transformer may be provided.

According to embodiments, the transformer stator may be arranged axially adjacent to the transformer rotor, seen along the rotation axis X. In this manner, any expansion of the transformer rotor due to a high rotational speed of the transformer rotor will not affect the transformer stator, which is arranged axially adjacent to the transformer rotor.

According to embodiments, the transformer rotor may be arranged around the spindle and may be connected to the spindle, and the transformer stator may be arranged around the spindle adjacent to the spindle. In this manner, the rotary transformer may be arranged at a distance from the separator bowl. This may be advantageous e.g. if flammable fluids are present in the separator bowl.

According to embodiments, the transformer rotor may be arranged on the separator bowl to rotate with the separator bowl, and the transformer stator may be arranged adjacent to the separator bowl. In this manner, short electrical conductors may be provided between the transformer rotor and a recipient of electric energy from the rotary transformer in the separator bowl. The user of electric energy being such a recipient of electric energy.

According to embodiments, the drive arrangement may comprise an electric motor comprising a motor rotor and a motor stator, wherein the motor rotor may form part of the spindle such that the spindle forms part of the drive arrangement, and wherein the transformer rotor may be arranged in a portion of the motor rotor. In this manner, a compact drive arrangement and rotary transformer may be provided.

According to one alternative, the centrifugal separator comprises an actuator arranged in the rotor arrangement, the actuator forming at least part of the user of electric energy. In this manner, the actuator is supplied with electric energy from the rotary transformer. Since the rotary transformer may continuously provide an electric current, the actuator may be continuously supplied with electric energy. Thus, the actuator may operate continuously as the rotor arrangement rotates, as well as when the rotor arrangement is not rotating, i.e. when it is stationary. Accordingly, from within the rotor arrangement, the actuator may control aspects, characteristics, performance, etc. of the centrifugal separator, and/or of the separation performed by the centrifugal separator.

According to embodiments, the centrifugal separator may comprise a valve arranged in the rotor arrangement, wherein the actuator is configured for actuating a movable mechanism of the valve. In this manner, e.g. a flow of a fluid may be controlled by the valve from inside the rotor arrangement.

According to one alternative, the centrifugal separator comprises a sensor arranged in the rotor arrangement, the sensor forming at least part of the user of electric energy. In this manner, the sensor is supplied with electric energy from the rotary transformer. Since the rotary transformer may continuously provide an electric current, the sensor may be continuously supplied with electric energy. Thus, the sensor may operate continuously as the rotor arrangement rotates, as well as when the rotor arrangement is not rotating, i.e. when it is stationary. Accordingly, from within the rotor arrangement, the sensor may sense parameters, aspects, characteristics, performance, etc. of the centrifugal separator, and/or of the separation performed by the centrifugal separator.

According to one alternative, the centrifugal separator comprises a control unit arranged in the rotor arrangement, the control unit forming at least part of the user of electric energy. In this manner, the control unit is supplied with electric energy from the rotary transformer. Since the rotary transformer may continuously supply an electric current, the control unit may be continuously supplied with electric energy. Thus, the control unit may operate continuously as the rotor arrangement rotates, as well as when the rotor arrangement is not rotating, i.e. when it is stationary. Accordingly, from within the rotor arrangement, the control unit may control and/or monitor parameters, aspects, characteristics, performance, etc. of the centrifugal separator, and/or of the separation performed by the centrifugal separator. The control unit may be configured to communicate with equipment outside the rotor arrangement.

According to embodiments, the centrifugal separator may be configured to transmit a signal from the transformer stator to the control unit via the transformer rotor. In this manner, the rotary transformer may be utilised for communication with the control unit arranged in the rotor arrangement. Similarly, the control unit may be configured for transmitting a signal from the control unit via the rotary transformer. Thus, the control unit may communicate with equipment outside the rotor arrangement.

According to a further aspect of the invention, the abovementioned object is achieved by a method of operating a centrifugal separator. The centrifugal separator comprises a rotor arrangement and a drive arrangement. The rotor arrangement comprises a spindle, a separator bowl enclosing a separation space, and a user of electric energy. The drive arrangement is connected to, or forms part of, the spindle and is configured to rotate the rotor arrangement about a rotation axis X. The centrifugal separator comprises a rotary transformer. The rotary transformer comprises a transformer stator and a transformer rotor, wherein the transformer stator and the transformer rotor are arranged adjacent to each other with an airgap therebetween, and wherein the transformer rotor comprises a secondary coil and is rotatable together with the rotor arrangement, and wherein the secondary coil is electrically connected to the user of electric energy. The centrifugal separator comprises an actuator arranged in the rotor arrangement, the actuator forming at least part of the user of electric energy, and/or the centrifugal separator comprises a sensor arranged in the rotor arrangement, the sensor forming at least part of the user of electric energy, and/or the centrifugal separator comprises a control unit arranged in the rotor arrangement, the control unit forming at least part of the user of electric energy. The method comprises steps of:

- continuously supplying an alternating electric current or pulsed DC electric current to the transformer stator,
- continuously receiving an alternating electric current in the transformer rotor, and
- supplying an electric current to the user of electric energy arranged in the rotor arrangement utilising the alternating current received during the step of continuously receiving an alternating electric current.

Since the method comprises steps of continuously supplying and receiving an alternating electric current, and supplying an electric current to the user of electric energy arranged in the rotor arrangement, the user of electric energy in the rotor arrangement is able to operate inside the rotor arrangement. Thus, stable operating conditions are provided for the user of electric energy. As a result, the abovementioned object is achieved.

An advantage of supplying the electric current to the user of electric energy via the rotary transformer may be that the electric current may be supplied both when the rotor arrangement is stationary as well as when the rotor arrangement is rotating.

According to embodiments, the method may comprise a step of:

- rotating the rotor arrangement about the rotation axis with the drive arrangement, and wherein the step of continuously supplying an alternating electric current to the transformer stator is performed during the step of rotating the rotor arrangement.

The centrifugal separator used in the method may be a centrifugal separator according to any one of aspects and/or embodiments discussed herein.

The features of, and advantages with, the invention discussed in the following detailed description relate to one or more aspects and/or embodiments of the invention.

BRIEF DESCRIPTION OF THE DRAWINGS

Various aspects and/or embodiments of the invention, including its particular features and advantages, will be readily understood from the example embodiments discussed in the following detailed description and the accompanying drawings, in which.

DETAILED DESCRIPTION

Aspects and/or embodiments of the invention will now be described more fully. Like numbers refer to like elements throughout. Well-known functions or constructions will not necessarily be described in detail for brevity and/or clarity.

Figure 1:
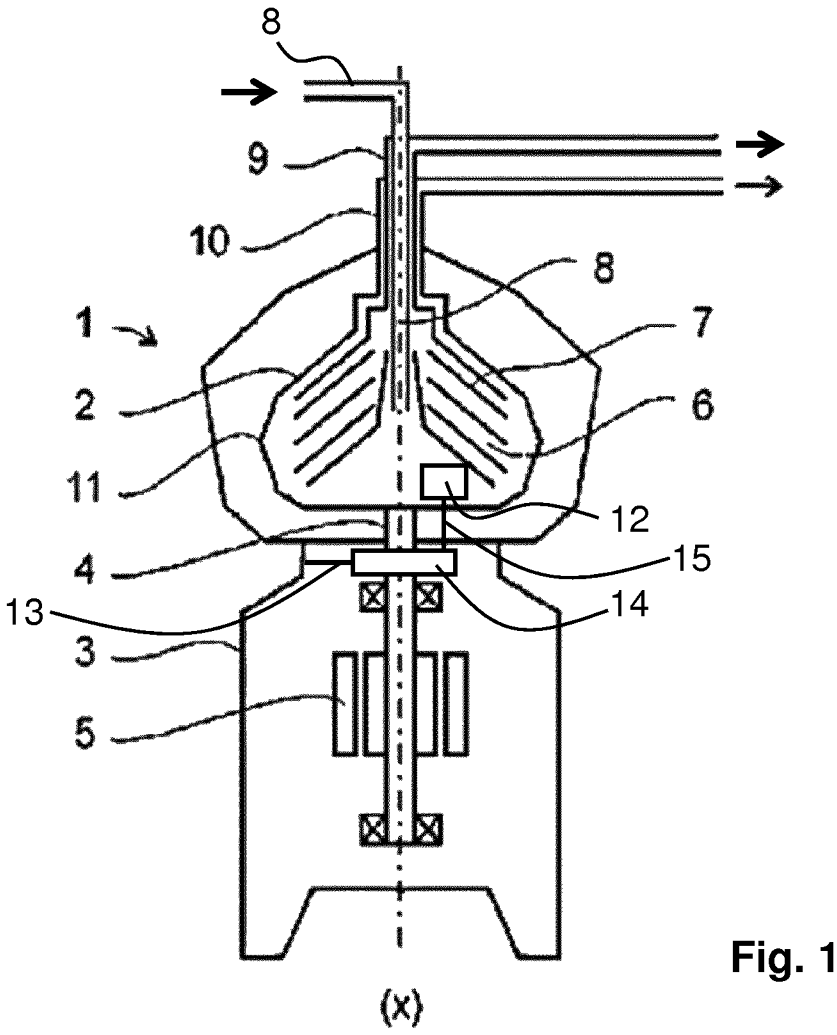
FIG. 1 schematically illustrates a cross section through a centrifugal separator according to embodiments.

FIG. 1 schematically illustrates a cross section through a centrifugal separator 1 according to embodiments. The centrifugal separator 1 comprises a rotor arrangement 2 and a drive arrangement 5. The rotor arrangement 2 comprises a separator bowl 11 and a spindle 4. The spindle 4 is supported in a housing 3 of the centrifugal separator 1, e.g. via at least two bearings. The housing 3 may comprise more than one individual part and thus, may be assemble from several parts. The drive arrangement 5 is configured to rotate the rotor arrangement 2 about a rotation axis (X).

In these embodiments, the drive arrangement 5 forms part of the spindle 4. That is, the rotor arrangement 2 is directly driven by the drive arrangement 5. The drive arrangement 5 comprises an electric motor and a rotor of the electric motor forms part of the spindle 4. In alternative embodiments, the drive arrangement may instead be connected to the spindle. Such alternative embodiments may comprise an electric motor connected e.g. via cog wheels, or a belt drive, to the spindle.

Inside the separator bowl 11 there is formed a separation space 6 in which centrifugal separation of a fluid mixture takes place. In the separation space 6 there is arranged a stack of frustoconical separation discs 7. The separation discs 7 provide for an efficient separation of the fluid mixture into at least a light fluid phase and a heavy fluid phase. The stack of frustoconical separation discs 7 is fitted centrally and coaxially with the rotation axis (X).

The centrifugal separator 1 may be configured for separating the fluid mixture into at least a lower density component, the light fluid phase, and a higher density component, the heavy fluid phase. The fluid mixture may comprise e.g. a liquid and a gas, or two liquids. The fluid mixture may comprise solid matter, which may be separated in the form of sludge from the fluid mixture in the centrifugal separator 1. The sludge may form the heavy fluid phase, or a phase separate from the light and heavy fluid phases.

In the illustrated embodiments, the fluid mixture to be separated is fed from the top of the centrifugal separator 1 via an inlet pipe 8 centrally down into the separator bowl 11. The separator bowl 11 has extending from it a light fluid phase outlet 9 for the lower density component separated from the fluid mixture extending through the housing 3 at the top of the centrifugal separator 1. Also, the separator bowl 11 has extending from it a heavy fluid phase outlet 10 for the higher density component separated from the fluid mixture extending through the housing 3 at the top of the centrifugal separator 1. The separator may comprise further outlets, e.g. for further phases having other densities than the densities of the light and heavy fluid phases withdrawn via outlets 9, 10. For instance sludge may be ejected from the separator bowl 11 via nozzles arranged at an outer periphery of the separator bowl 11.

The present invention is not limited to any particular type of fluid mixture or separated fluid phases. Neither is the present invention limited to any particular inlet arrangement for the fluid mixture, nor to any particular outlet arrangements for the separated fluid phases.

The rotor arrangement 2 comprises a user of electric energy 12. The centrifugal separator 1 comprises a rotary transformer 14 for supplying electric energy to the user of electric energy 12. The rotary transformer 14 is configured for continuously supplying an electric current to the rotor arrangement 2. An electric current from the rotary transformer 14 may be directly, or indirectly, supplied to the user of electric energy 12 arranged in the rotor arrangement 2. The rotary transformer 14 is fed with an electric current via a first electric circuit 13. The first electric circuit 13 may at least comprise conductors leading to the rotary transformer 14. The electric current may be supplied from the rotary transformer 14 to the user of electric energy 12 via a second electric circuit 15. The second electric circuit 15 may at least comprise conductors leading from the rotary transformer 14 to the user of electric energy 12.

The continuously supplied electric current to the rotor arrangement 14 may be a continuous AC current, or a continuously pulsed DC current. The continuous AC current or the continuously pulsed DC current may be rectified in a rectifier arrangement (not shown) before being utilised as electric energy by the user of electric energy 12. The rectifier may form part of the user of electric energy 12. The electric current supplied to the rotor arrangement 2 and the electric energy supplied to the user of electric energy 12 may be supplied when the rotor arrangement 14 is standing still as well as when the rotor arrangement 2 is rotating.

Figure 2:
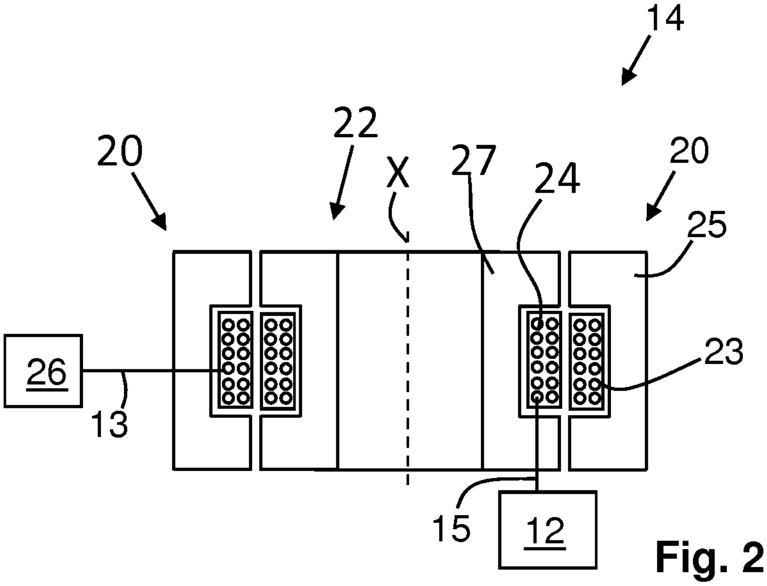
FIGS. 2 and 3 illustrate two embodiments of a rotary transformer of a centrifugal separator, FIG. 4 schematically illustrates a side view of a rotor arrangement of a centrifugal separator according to embodiments, FIG. 5 schematically illustrates a cross section through a drive arrangement of a centrifugal separator according to embodiments, FIG. 6*a*-6*c* schematically illustrate cross sections through centrifugal separators according to embodiments.
Figure 3:
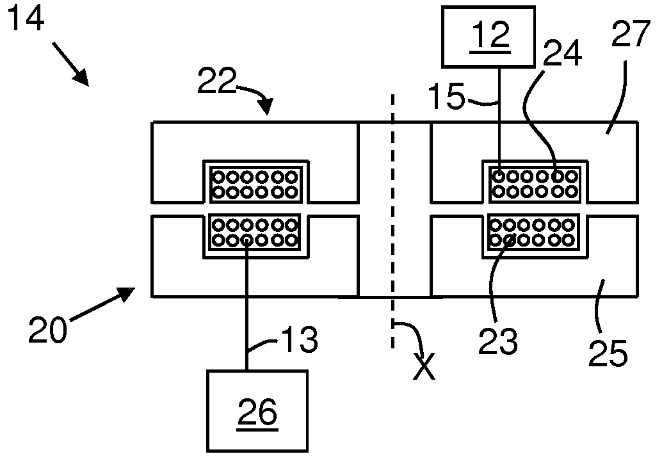

FIGS. 2 and 3 illustrate cross sections through two embodiments of a rotary transformer 14 of a centrifugal separator, e.g. such as the centrifugal separator 1 of FIG. 1.

The rotary transformers 14 according to both embodiments comprise a transformer stator 20 and a transformer rotor 22. The transformer stator 20 is configured to be arranged in the centrifugal separator, fixed in relation to a housing of centrifugal separator. The transformer rotor 22 is configured to be connected to a rotor arrangement of the centrifugal separator, and thus, configured to rotate together with the rotor arrangement around the rotation axis X of the rotor arrangement. The transformer stator 20 and the transformer rotor 22 extend around the rotation axis X.

The transformer stator 20 and the transformer rotor 22 are arranged adjacent to each other with an airgap therebetween. In the embodiments of FIG. 2, the transformer stator 20 is arranged radially outside the transformer rotor 22, seen from the rotation axis X. Thus, in the embodiments of FIG. 2, the airgap extends in parallel with the rotation axis X, forming an imaginary cylinder between the transformer stator and rotor 20, 22. In the embodiments of FIG. 3, the transformer stator 20 is arranged axially adjacent to the transformer rotor 22, seen along the rotation axis X. Thus, in the embodiments of FIG. 3, the airgap extends perpendicularly to the rotation axis X, forming an imaginary disc between the transformer stator and rotor 20, 22.

The transformer stator 20 comprises a primary coil 23 wound around a primary core 25. The transformer rotor 22 comprises a secondary coil 24 wound around a secondary core 27. The primary coil 23 extends rotation-symmetrical about the rotation axis X. The primary coil 24 extends rotation-symmetrical about the rotation axis X. Suitably, each of the primary and secondary cores 25, 27 may be made from a magnetically permeable material.

In use of the rotary transformer 14, an alternating electric current or pulsed electric current is supplied for transfer from the transformer stator 20 to the transformer rotor 22. More specifically, a schematically indicated electric circuitry 26 is configured to supply an alternating current or pulsed DC current to the primary coil 23. Thus, magnetic flux is generated by the primary coil 23 and transferred to the to the transformer rotor 22. The magnetic flux generates an alternating current in the secondary coil 24. The magnetic permeability of the primary and secondary cores 25, 27 ensures energy efficient transfer of the magnetic flux from the transformer stator 20 to the transformer rotor 22.

The electric circuitry 26 is connected to the primary coil 23 via a first electric circuit 13. The electric circuitry 26 may be arranged in the centrifugal separator, or alternatively, may be arranged outside the centrifugal separator. The electric circuitry 26 may form part of a control system of the centrifugal separator.

The secondary coil 24 is connected to a user of electric energy 12 via a second electric circuit 15. The user of electric energy 12 is arranged in a rotor arrangement of the centrifugal separator. The alternating current generated in the secondary coil 24 forms the basis for electric energy supplied to the user of electric energy 12. The user of electric energy 12 may be provided with the alternating current. Alternatively, the user of electric energy 12 may be provided with a rectified current. Accordingly, the second electric circuit 15 may comprise a rectifier for rectifying the alternating current from the secondary coil 24.

Thus, an electric current may be supplied from the secondary coil 24 to the user of electric energy 12 via the second electric circuit 15, which may comprise e.g. conductors and a rectifier arrangement.

Each of the primary and secondary coils 23, 24 comprises a conductor forming a number of coil windings. The conductor is electrically insulated such that individual coil windings are isolated from each other, i.e. the coil windings are not short circuited. By adapting the number of coil windings of each of the primary and secondary coils 23, 24 the voltage in the secondary coil 24 may be transformed in a known manner.

Each of the primary and secondary cores 25, 27 may comprise a ferritic material. Thus, a high magnetic permeability may be ensured in the primary and secondary cores 25, 27. The cores 25, 27 may comprise a number of separate core layers stacked on top of each other. Thus, the magnetic flux in the cores 25, 27 may be less disturbed than if each of the cores 25, 27 were made of a solid block of material.

The frequency of the alternating current may be that of the mains, e.g. 50 Hz or 60 Hz. Alternatively, the frequency may be higher, such as in the order of hundreds of Hz or thousands of Hz. Mentioned purely as an example the frequency may be 70 kHz.

Figure 4:
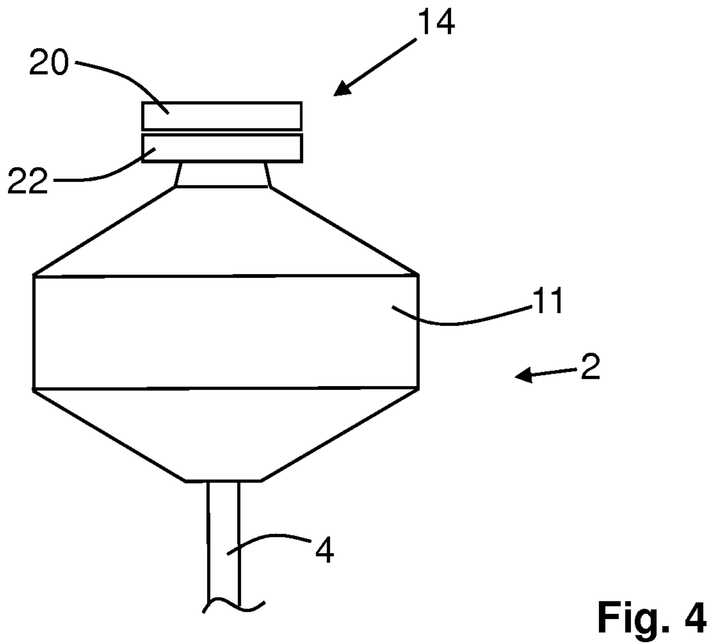

FIG. 4 schematically illustrates a side view of a rotor arrangement 2 of a centrifugal separator according to embodiments. The centrifugal separator may be a centrifugal separator 1 as discussed above in connection with FIG. 1.

In these embodiments, a rotary transformer 14 is arranged at the separator bowl 11. Again, the electric current transferred via the rotary transformer 14 is utilised for supplying electric current to a user of electric energy arranged in the rotor arrangement 2.

Again, the rotary transformer 14 comprises a transformer stator 20 and a transformer rotor 22, according to any one of the embodiments as discussed above with reference to of FIGS. 2 and 3. In these embodiments, the transformer rotor 22 is arranged on the separator bowl 11 to rotate with the separator bowl 11. The transformer stator 20 is arranged adjacent to the separator bowl 11 and fixed in relation to a housing (not shown) of the centrifugal separator. The rotary transformer 14 shown in FIG. 4 resembles the rotary transformer of FIG. 3, but the rotary transformer may alternatively be of the kind shown in FIG. 2. Accordingly, the discussion above related to the embodiments of FIGS. 2 and 3 also relates to these embodiments disclosed in FIG. 4.

Figure 5:
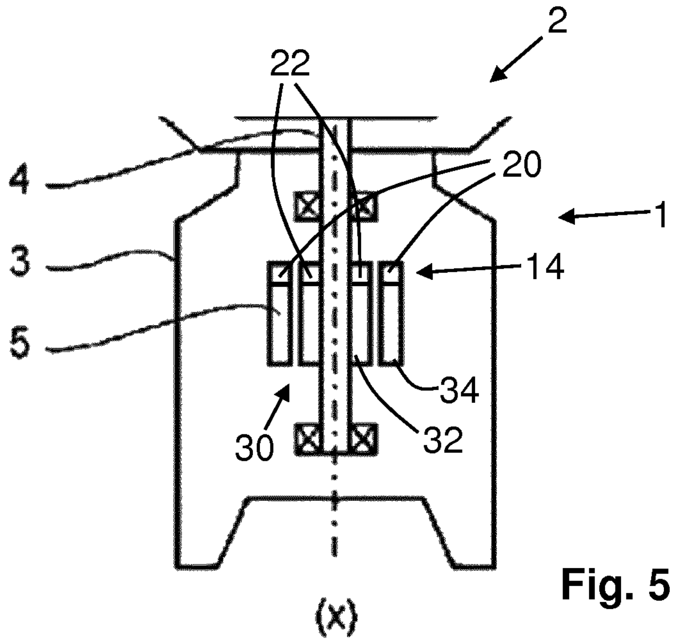

FIG. 5 schematically illustrates a cross section through a drive arrangement 5 of a centrifugal separator 1 according to embodiments. The centrifugal separator 1 may be a centrifugal separator 1 as discussed above in connection with FIG. 1.

In these embodiments, a rotary transformer 14 is arranged in connection with a drive arrangement 5 of the centrifugal separator 1. Again, the electric current transferred via the rotary transformer 14 is utilised for supplying electric current to a user of electric energy arranged in the rotor arrangement 2.

The drive arrangement 5 is arranged in a housing 3 of the centrifugal separator 1. The drive arrangement 5 is configured to drive a spindle 4 of the rotor arrangement 2.

Again, the rotary transformer 14 comprises a transformer stator 20 and a transformer rotor 22. The drive arrangement 5 comprises an electric motor 30 comprising a rotor 32 and a stator 34. The rotor 32 forms part of the spindle 4 such that the spindle 4 forms part of the drive arrangement 5. The transformer rotor 22 is arranged in a portion of the rotor 32 of the electric motor 30. The transformer stator 20 is arranged in a portion of the stator 34 of the electric motor 30.

Moreover, these embodiments also form an example of embodiments, wherein the transformer rotor 22 is arranged around the spindle 4 and is connected to the spindle 4, and the transformer stator 20 is arranged around the spindle 4 adjacent to the spindle 4. The transformer stator 20 is fixed in relation to the housing 3 and thus, is stationary in relation to the spindle 4.

The rotary transformer 14 shown in FIG. 5 resembles the rotary transformer of FIG. 2, but the rotary transformer may alternatively be of the kind shown in FIG. 3. Accordingly, the discussion above related to the embodiments of FIGS. 2 and 3 also relates to these embodiments disclosed in FIG. 5.

An electric current may be continuously transferred from the transformer stator to the transformer rotor in the different embodiments of rotary transformers 14 and their arrangement in centrifugal separators 1 discussed above with reference to FIGS. 1-5. The electric current may be continuously transferred while the rotor arrangement 2 of the relevant centrifugal separator 1 rotates. Moreover, electric current may be continuously transferred while the rotor arrangement 2 of the relevant centrifugal separator 1 is stationary.

An alternating current, or AC current, is a current that which periodically reverses direction, and thus, changes polarity at a certain frequency. A pulsed DC current is a current that periodically flows in one direction only, and thus, varies between 0 and a voltage of one polarity at a certain frequency. Stable operating conditions are provided for the user of electric energy in the rotor arrangement 2 of the centrifugal separator 1 due to the rotary transformer 14 and a continuous AC electric current or pulsed DC electric current supplied to the rotary transformer 14.

According to some embodiments, the rotary transformer 14, may provide a power of at least 1.2 W to the user of electric energy 12. The power of at least 1.2 W may be provided at a voltage of e.g. 24 $V_{RMS}$, and a current of 50 $mA_{RMS}$. In such embodiment, the power may be sufficient for supplying electric energy to a user of electric energy 12, comprising e.g. a sensor, and/or a control unit.

According to some embodiments, the rotary transformer 14 may provide a power of at least 6 W to the user of electric energy 12. The power of at least 6 W may be provided at a voltage of e.g. 24 $V_{RMS}$, and a current of 250 $mA_{RMS}$. In such embodiment, the power may be sufficient for supplying electric energy to a user of electric energy 12, comprising one or more of e.g. a DC motor, an actuator, a capacitor for storing electric energy, a sensor, and/or a control unit.

According to some embodiments, the rotary transformer 14 may provide a power within a range of 1-5 W, which may be provided at a voltage of e.g. 12 $V_{RMS}$ or 24 $V_{RMS}$.

According to some embodiments, the rotary transformer 14 may provide a power within a range of 4-10 W, which may be provided at a voltage of e.g. 12 $V_{RMS}$ or 24 $V_{RMS}$.

According to some embodiments, the rotary transformer 14 may provide a power within a range of 1-10 W, which may be provided at a voltage of e.g. 12 $V_{RMS}$ or 24 $V_{RMS}$.

According to some embodiments, the rotary transformer 14 may provide much higher power. For instance, the rotary transformer 14 may provide at least 50 W, or at least 100 W, or at least 500 W. The power may be provided at a voltage of e.g. 12 $V_{RMS}$, 24 $V_{RMS}$, or 48 $V_{RMS}$. In such embodiment, the power may be sufficient for supplying electric energy to a user of electric energy 12, comprising one or more large electric energy consumers, such as e.g. a DC motor, or an actuator.

The rotary transformer 14 is arranged for providing electric energy to a user of electric energy 12 in the rotor arrangement 2 of a centrifugal separator 1. Thus, possibilities are opened up, inter alia for:

- measuring parameters of the centrifugal separator or the separation process inside the rotor arrangement,
- communicating data form the rotor arrangement to a system outside the rotor arrangement,
- communicating from outside the rotor arrangement with e.g. a control system inside the rotor arrangement,
- etc.

Figure 6A:
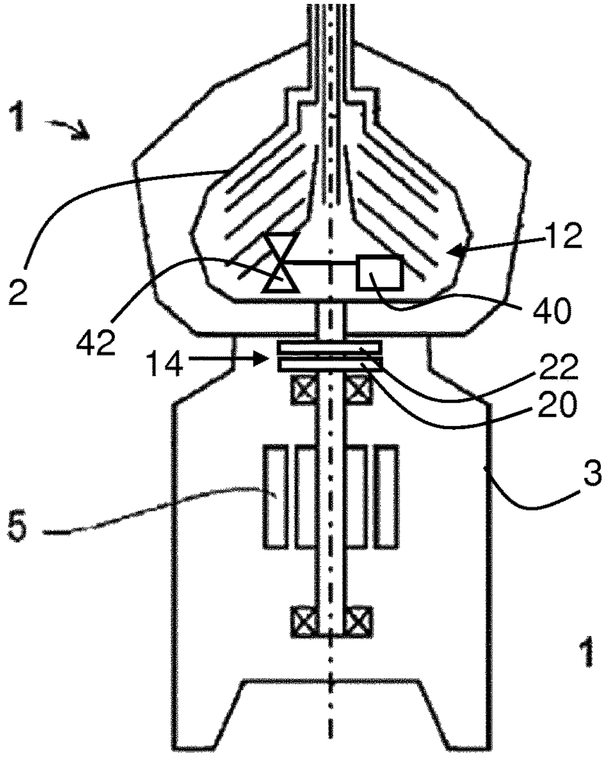

FIG. 6*a* schematically illustrates a cross section through a centrifugal separator 1 according to embodiments. The centrifugal separator 1 comprises a rotor arrangement 2, a drive arrangement 5, and a rotary transformer 14. Again, a user of electric energy 12 is arranged in the rotor arrangement 2.

In these embodiments, the centrifugal separator 1 comprises an actuator 40 arranged in the rotor arrangement 2. The actuator 40 forms at least part of the user of electric energy 12. The actuator 40 is supplied with electric energy from the rotary transformer 14. The user of electric energy 12 may comprise further components or devices in addition to the actuator 40.

According to some embodiments, the centrifugal separator 1 may comprise a valve 42 arranged in the rotor arrangement 2. The actuator 40 may be configured for actuating a movable mechanism of the valve 42. In this manner, the valve 42 may be controlled by the actuator 40, i.e. electric energy provided by the rotary transformer 14 may be utilised for controlling a valve arranged in the rotor arrangement 2.

FIG. 6*a* also illustrates embodiments of the rotary transformer 14, wherein the transformer rotor 22 is arranged around the spindle 4 and is connected to the spindle 4, and the transformer stator 20 is arranged around the spindle 4 adjacent to the spindle 4. The transformer stator 20 is fixed in relation to the housing 3 and thus, stationary in relation to the spindle 4.

The above discussed aspect of the user of electric energy 12 comprising an actuator 40 and a valve 42 is not linked to the disclosed embodiment of the rotary transformer 14.

Figure 6B:
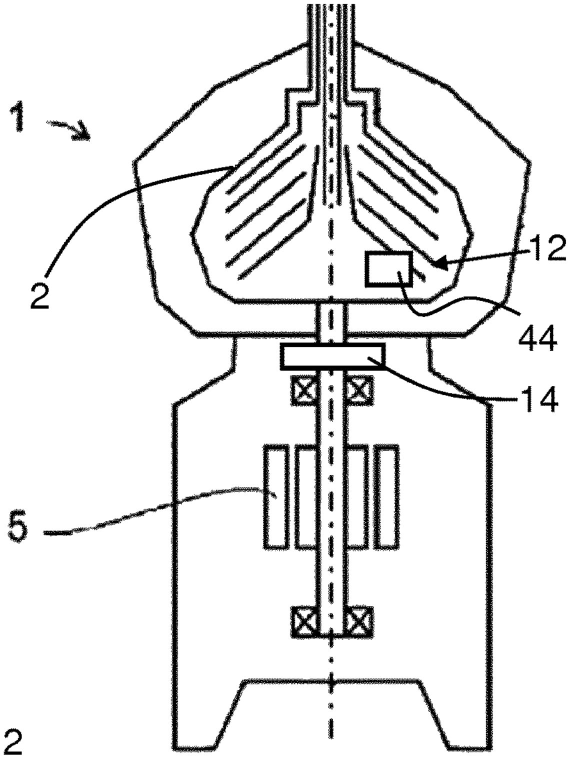

FIG. 6*b* schematically illustrates a cross section through a centrifugal separator 1 according to embodiments. The centrifugal separator 1 comprises a rotor arrangement 2, a drive arrangement 5, and a rotary transformer 14 according to any one of the previously discussed embodiments. Again, a user of electric energy 12 is arranged in the rotor arrangement 2.

In these embodiments, the centrifugal separator 1 comprises a sensor 44 arranged in the rotor arrangement 2. The sensor 44 forms at least part of the user of electric energy 12. That is, the user of electric energy 12 may comprise further components or devices in addition to the sensor 44. The sensor 44 is supplied with electric energy from the rotary transformer 14.

Figure 6C:
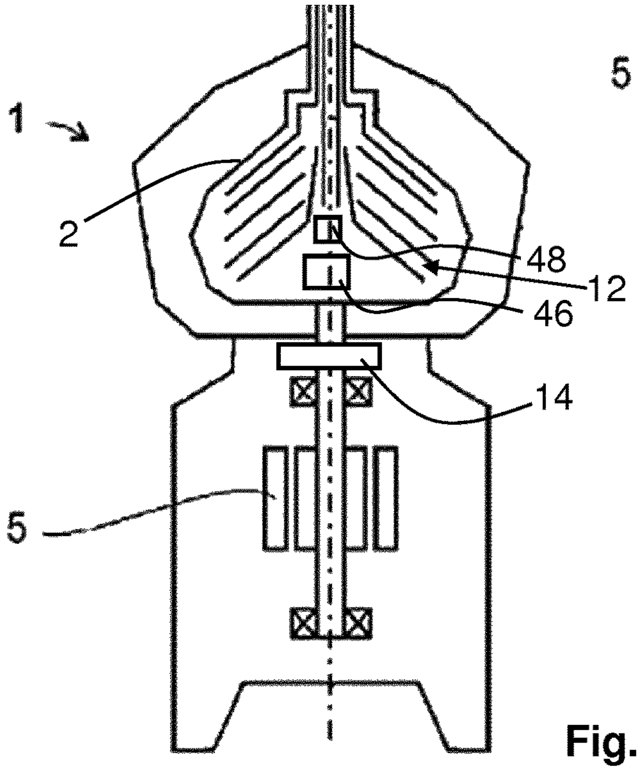

FIG. 6*c* schematically illustrates a cross section through a centrifugal separator 1 according to embodiments. The centrifugal separator 1 comprises a rotor arrangement 2, a drive arrangement 5, and a rotary transformer 14 according to any one of the previously discussed embodiments. Again, a user of electric energy 12 is arranged in the rotor arrangement 2.

In these embodiments, the centrifugal separator 1 comprise a control unit 46 arranged in the rotor arrangement 2. The control unit 46 forms at least part of the user of electric energy 12. That is, the user of electric energy 12 may comprise further components or devices in addition to the control unit 46. The control unit 46 is supplied with electric energy from the rotary transformer 14.

With reference to FIGS. 6*a*-6*c*, in the rotor arrangement 2 of a centrifugal separator 1, a user of electric energy 12 may comprise one or more of each of the actuator 40, the valve 42, the sensor 44, and the control unit 46, and/or various combinations of one or more of the actuator 40, the valve 42, the sensor 44, and the control unit 46.

In addition thereto, the user of electric energy 12 may comprise a communication unit 48, as exemplified in FIG. 6*c*. The communication unit 48 may for instance comprise Bluetooth communication device for wireless communication. An alternative communication unit 48 may communicate via the secondary coil 24 of the rotary transformer 14, see FIGS. 2 and 3. A high frequency communication signal may be transmitted and/or received via the secondary coil 24. The high frequency communication signal is overlaid over the continuous AC current generated in the secondary coil 24. Similarly, the primary coil 23 may be utilised for transmitting and/or receiving a high frequency communication signal to and/or from the communication unit 48, via the secondary coil 24. Accordingly, the centrifugal separator 1 is configured to transmit a signal from the transformer stator 20 to the control unit 46 via the transformer rotor 22.

Via the communication unit 48, e.g. data, control instructions, etc. may be sent to/from the rotor arrangement 2.

The different components of a user of electric energy 12 in a rotor arrangement 2 may be connected with each other for communicating data, control instructions, etc. therebetween. In order to reduce centrifugal forces on components of the user of electric energy 12, one or more of the components may be arranged close to the rotation axis of the rotor arrangement 2. The different components of a user of electric energy 12 are supplied, directly or indirectly, with electrical energy from the rotary transformer 14.

A few examples of users of electric energy 12, and their function:

The sensor 44 may provide measurement data to the control unit 46 for operation of the centrifugal separator.

The control unit 46 may be connected to the actuator 40 for providing a control signal to the actuator 40.

The communication unit 48 may send measurement data from the sensor 44 to an external recipient of the data.

The communication unit 48 may receive control instructions for the centrifugal separator from an external sender, and send control instructions to the control unit 46.

Figure 7:
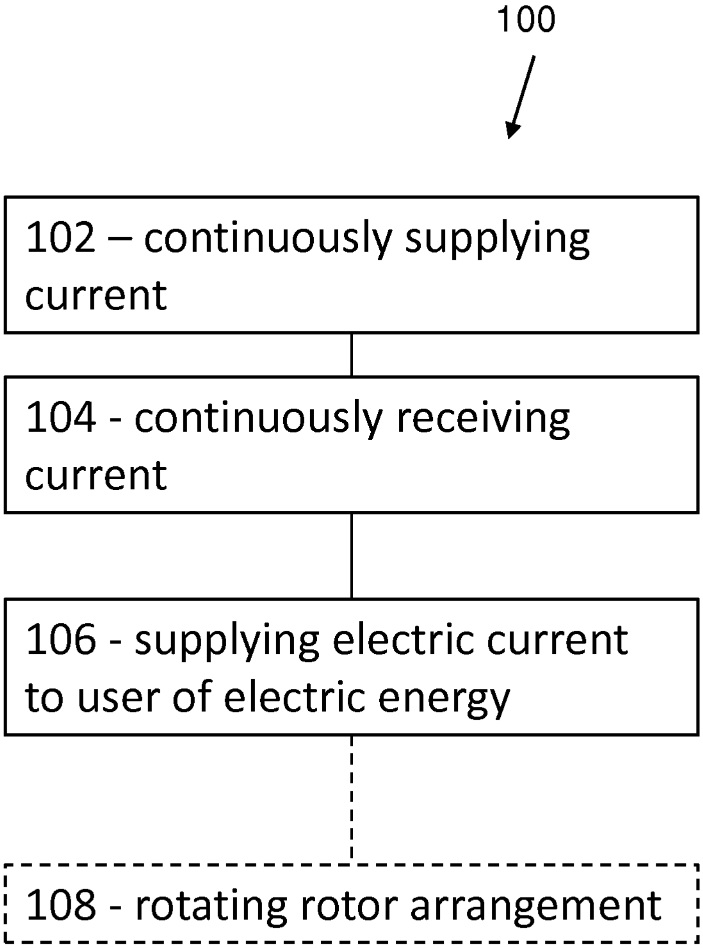
FIG. 7 illustrates a method of operating a centrifugal separator.

FIG. 7 illustrates a method 100 of operating a centrifugal separator. The centrifugal separator may be a centrifugal separator 1 as discussed in connection with FIGS. 1-6*c*. The centrifugal separator 1 comprises a rotary transformer 14 for transferring an electric current to a user of electric energy arranged in a rotor arrangement of the centrifugal separator. The rotary transformer may be a rotary transformer 14 as discussed in connection with FIGS. 1-6*c*. Accordingly, the centrifugal separator 1 comprises the rotor arrangement 2, a drive arrangement 5, and the user of electric energy 12. The rotor arrangement 2 has a rotation axis (X) and comprises a spindle 4 and a separator bowl 12. The drive arrangement 5 is connected to, or forms part of, the spindle 4 and is configured to rotate the rotor arrangement 2 about the rotation axis X.

The method 100 comprises steps of:

continuously supplying 102 an alternating electric current or pulsed DC electric current to the transformer stator 20, continuously receiving 104 an alternating electric current in the transformer rotor 22, and supplying an electric current 106 to the user of electric energy 12 arranged in the rotor arrangement 2 utilising the alternating current received during the step of continuously receiving 104 an alternating electric current.

According to some embodiments, the method 100 may comprise a step of:

rotating 108 the rotor arrangement 2 about the rotation axis (X) with the drive arrangement 5, wherein the step of continuously supplying 102 an alternating electric current to the transformer stator 20 is performed during the step of rotating 108 the rotor arrangement 2.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the invention, as defined by the appended claims.

The invention claimed is:

1. A centrifugal separator comprising:

a rotor arrangement; and a drive arrangement, wherein the rotor arrangement comprises a spindle, a separator bowl enclosing a separation space, and a user of electric energy, wherein the centrifugal separator comprises an inlet for a fluid mixture, and an outlet for a separated fluid, wherein the inlet is fluidly connected with the separation space, and the outlet is fluidly connected with the separation space, wherein the drive arrangement is connected to, or forms part of, the spindle and is configured to rotate the rotor arrangement about a rotation axis, wherein the centrifugal separator comprises a rotary transformer, the rotary transformer comprising a transformer stator and a transformer rotor, wherein the transformer stator and the transformer rotor are arranged adjacent to each other with an airgap therebetween, wherein the transformer rotor comprises a coil and is rotatable together with the rotor arrangement, wherein the coil is electrically connected to the user of electric energy arranged in the rotor arrangement for providing the user of electric energy with an electric current, wherein:

the centrifugal separator comprises an actuator arranged in the rotor arrangement, the actuator at least part of the user of electric energy; or the centrifugal separator comprises a sensor arranged in the rotor arrangement, the sensor forming at least part of the user of electric energy; or the centrifugal separator comprises a control unit arranged in the rotor arrangement, the control unit forming at least part of the user of electric energy, and wherein the transformer rotor is arranged on the separator bowl to rotate with the separator bowl, and wherein the transformer stator is arranged adjacent to the separator bowl.

2. The centrifugal separator according to claim 1, wherein the transformer stator is arranged radially outside the transformer rotor, seen from the rotation axis.

3. The centrifugal separator according to claim 2, comprising an actuator arranged in the rotor arrangement the actuator forming at least part of the user of electric energy, and comprising a valve arranged in the rotor arrangement, wherein the actuator is configured for actuating a movable mechanism of the valve.

4. The centrifugal separator according to claim 1, wherein the transformer stator is arranged axially adjacent to the transformer rotor, seen along the rotation axis.

5. The centrifugal separator according to claim 4, comprising an actuator arranged in the rotor arrangement the actuator forming at least part of the user of electric energy, and comprising a valve arranged in the rotor arrangement, wherein the actuator is configured for actuating a movable mechanism of the valve.

6. The centrifugal separator according to claim 1, comprising an actuator arranged in the rotor arrangement the actuator forming at least part of the user of electric energy, and comprising a valve arranged in the rotor arrangement, wherein the actuator is configured for actuating a movable mechanism of the valve.

7. The centrifugal separator according to claim 1, comprising a control unit arranged in the rotor arrangement, the control unit forming at least part of the user of electric energy, wherein the centrifugal separator is configured to transmit a signal from the transformer stator to the control unit via the transformer rotor.

8. The centrifugal separator according to claim 1, wherein the rotary transformer is configured to provide a power within a range of 1-10 W to the user of electric energy, or to provide a power of at least 6 W to the user of electric energy.

9. The centrifugal separator according to claim 1, wherein the rotary transformer is configured to provide a power of at least 50 W to the user of electric energy.

10. A centrifugal separator comprising:

a rotor arrangement; and a drive arrangement, wherein the rotor arrangement comprises a spindle, a separator bowl enclosing a separation space, and a user of electric energy, wherein the centrifugal separator comprises an inlet for a fluid mixture, and an outlet for a separated fluid, wherein the inlet is fluidly connected with the separation space, and the outlet is fluidly connected with the separation space, wherein the drive arrangement is connected to, or forms part of, the spindle and is configured to rotate the rotor arrangement about a rotation axis, wherein the centrifugal separator comprises a rotary transformer, the rotary transformer comprising a transformer stator and a transformer rotor, wherein the transformer stator and the transformer rotor are arranged adjacent to each other with an airgap therebetween, wherein the transformer rotor comprises a coil and is rotatable together with the rotor arrangement, wherein the coil is electrically connected to the user of electric energy arranged in the rotor arrangement for providing the user of electric energy with an electric current, wherein:

the centrifugal separator comprises an actuator arranged in the rotor arrangement, the actuator at least part of the user of electric energy; or the centrifugal separator comprises a sensor arranged in the rotor arrangement, the sensor forming at least part of the user of electric energy; or the centrifugal separator comprises a control unit arranged in the rotor arrangement, the control unit forming at least part of the user of electric energy, and wherein the drive arrangement comprises an electric motor comprising a motor rotor and a motor stator, wherein the motor rotor forms part of the spindle such that the spindle forms part of the drive arrangement, and wherein the transformer rotor is arranged in a portion of the motor rotor.

11. A centrifugal separator comprising:

a rotor arrangement comprising a spindle and a separator bowl enclosing a separation space;

a drive arrangement connected to, or forms part of, the spindle and is configured to rotate the rotor arrangement about a rotation axis;

a user of electric energy;

an inlet for a fluid mixture fluidly connected with the separation space, and an outlet for a separated fluid fluidly connected with the separation space;

a rotary transformer, the rotary transformer comprising a transformer stator and a transformer rotor;

wherein the transformer stator and the transformer rotor are arranged adjacent to each other with an airgap therebetween, wherein the transformer rotor comprises a coil and is rotatable together with the rotor arrangement, wherein the coil is electrically connected to the user of electric energy arranged in the rotor arrangement for providing the user of electric energy with an electric current, and wherein the transformer rotor is arranged on the separator bowl to rotate with the separator bowl, and wherein the transformer stator is arranged adjacent to the separator bowl.

* * * * *